United States Patent
Nagarajan et al.

(10) Patent No.: US 12,393,529 B2
(45) Date of Patent: *Aug. 19, 2025

(54) STREAMING TRANSFERS AND ORDERING MODEL

(71) Applicant: Google LLC, Mountain View, CA (US)

(72) Inventors: Rahul Nagarajan, San Jose, CA (US); Arpith Chacko Jacob, Los Altos, CA (US); Suvinay Subramanian, Sunnyvale, CA (US); Hema Hariharan, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,835

(22) Filed: Mar. 6, 2024

(65) Prior Publication Data
US 2024/0211413 A1    Jun. 27, 2024

Related U.S. Application Data

(63) Continuation of application No. 17/722,782, filed on Apr. 18, 2022, now Pat. No. 11,977,499.
(Continued)

(51) Int. Cl.
*G06F 13/16*    (2006.01)
*G06F 9/35*    (2018.01)
(Continued)

(52) U.S. Cl.
CPC .............. *G06F 13/161* (2013.01); *G06F 9/35* (2013.01); *G06F 9/3869* (2013.01); *G06F 9/522* (2013.01)

(58) Field of Classification Search
None
See application file for complete search history.

(56) References Cited

U.S. PATENT DOCUMENTS

| | | |
|---|---|---|
| 6,704,860 B1 | 3/2004 | Moore |
| 7,206,922 B1 | 4/2007 | Steiss |

(Continued)

FOREIGN PATENT DOCUMENTS

| | | |
|---|---|---|
| JP | 2018521427 A | 8/2018 |
| JP | 2021177366 A | 11/2021 |

(Continued)

OTHER PUBLICATIONS

Chole et al. SparseCore: An Accelerator for Structurally Sparse CNNs. 2018. 3 pages. Retrieved from the Internet: <https://mlsys.org/Conferences/doc/2018/72.pdf>.

(Continued)

*Primary Examiner* — Yaima Rigol
(74) *Attorney, Agent, or Firm* — Lerner David LLP

(57) ABSTRACT

Generally disclosed herein is a hardware/software interface for asynchronous data movement between an off-core memory and a core-local memory, referred to as "stream transfers", and a stream ordering model. The stream transfers allow software to more efficiently express common data-movement patterns, specifically ones seen in sparse workloads. Direct stream instructions that belong to a stream are processed in-order. For indirect stream instructions, offset elements in an offset list are processed in order. A sync flag is updated to indicate monotonic incremental progress for the stream.

20 Claims, 7 Drawing Sheets

Related U.S. Application Data

(60) Provisional application No. 63/322,285, filed on Mar. 22, 2022.

(51) Int. Cl.
*G06F 9/38* (2018.01)
*G06F 9/52* (2006.01)

(56) References Cited

U.S. PATENT DOCUMENTS

| | | | |
|---|---|---|---|
| 7,248,266 | B2 | 7/2007 | Tuomi |
| 7,249,202 | B2 | 7/2007 | Simon et al. |
| 7,461,210 | B1 | 12/2008 | Wentzlaff et al. |
| 7,613,886 | B2 | 11/2009 | Yamazaki |
| 7,636,835 | B1 | 12/2009 | Ramey et al. |
| 7,917,701 | B2 | 3/2011 | Charra et al. |
| 9,086,872 | B2 | 7/2015 | Hargil et al. |
| 9,323,672 | B2 | 4/2016 | Kim et al. |
| 9,628,146 | B2 | 4/2017 | Van Nieuwenhuyze et al. |
| 9,851,917 | B2 | 12/2017 | Park et al. |
| 10,977,201 | B1 * | 4/2021 | McKay ............... G06F 13/4027 |
| 11,113,233 | B1 | 9/2021 | Volpe |
| 11,182,110 | B1 | 11/2021 | Ansari et al. |
| 11,210,760 | B2 | 12/2021 | Nurvitadhi et al. |
| 11,340,792 | B2 | 5/2022 | Danilov et al. |
| 2003/0179209 | A1 * | 9/2003 | Kulkarni ............ G06F 12/0684 |
| | | | 711/E12.089 |
| 2004/0133765 | A1 | 7/2004 | Tanaka et al. |
| 2007/0198901 | A1 | 8/2007 | Ramchandran et al. |
| 2012/0159130 | A1 | 6/2012 | Smelyanskiy et al. |
| 2012/0303932 | A1 | 11/2012 | Farabet et al. |
| 2013/0151482 | A1 | 6/2013 | Tofano |
| 2016/0041775 | A1 * | 2/2016 | Hanson ............... G06F 11/3423 |
| | | | 711/169 |
| 2017/0004089 | A1 | 1/2017 | Clemons et al. |
| 2017/0351516 | A1 | 12/2017 | Mekkat et al. |
| 2018/0067899 | A1 | 3/2018 | Rub |
| 2018/0081690 | A1 | 3/2018 | Krishna et al. |
| 2018/0109449 | A1 | 4/2018 | Sebexen et al. |
| 2018/0217836 | A1 | 8/2018 | Johnson |
| 2018/0285233 | A1 | 10/2018 | Norrie et al. |
| 2018/0322387 | A1 | 11/2018 | Sridharan et al. |
| 2019/0004814 | A1 | 1/2019 | Chen et al. |
| 2019/0050717 | A1 | 2/2019 | Temam et al. |
| 2019/0121784 | A1 | 4/2019 | Wilkinson et al. |
| 2019/0303311 | A1 | 10/2019 | Bilski et al. |
| 2019/0340722 | A1 | 11/2019 | Aas et al. |
| 2020/0120154 | A1 | 4/2020 | Ren et al. |
| 2020/0183738 | A1 | 6/2020 | Champigny |
| 2020/0192742 | A1 | 6/2020 | Boettcher et al. |
| 2020/0293488 | A1 | 9/2020 | Ray et al. |
| 2020/0310797 | A1 | 10/2020 | Corbal et al. |
| 2021/0081691 | A1 | 3/2021 | Chen et al. |
| 2021/0109761 | A1 | 4/2021 | Wang et al. |
| 2021/0194793 | A1 | 6/2021 | Huse |
| 2021/0303481 | A1 | 9/2021 | Ray et al. |
| 2021/0326067 | A1 | 10/2021 | Li |
| 2022/0012060 | A1 | 1/2022 | Fok et al. |
| 2023/0229524 | A1 | 7/2023 | Dearth et al. |

FOREIGN PATENT DOCUMENTS

| | | |
|---|---|---|
| JP | 2021532430 A | 11/2021 |
| WO | 9707451 A2 | 2/1997 |
| WO | 2006106342 A2 | 10/2006 |

OTHER PUBLICATIONS

Chhugan et al., "Efficient Implementation of Sorting on Multi-Core SIMD CPU Architecture", PVLDB '08, Aug. 23-28, 2008, Auckland, New Zealand, 12 pages.

Yavits et al., "Sparse Matrix Multiplication on an Associative Processor", retrieved from the Internet on Nov. 19, 2021 <https://arxiv.org/ftp/arxiv/papers/1705/1705.07282.pdf>, 10 pages.

Batcher odd-even mergesort, From Wikipedia, the free encyclopedia, retrieved from the Internet on Nov. 19, 2021 <https://en.wikipedia.org/wiki/Batcher_odd%E2%80%93even_mergesort>, 2 pages.

Fang et al. Active Memory Operations. Proceedings of the International Conference on Supercomputing—Proceedings of ICS07: 21st ACM International Conference on Supercomputing 2007 Association for Computing Machinery US, ACM, 2 Penn Plaza, Suite 701 New York, NY 10121-0701 USA, Jun. 17, 2007 (Jun. 17, 2007), pp. 232-241, DOI: 10.1145/1274971.1275004.

International Search Report and Written Opinion for International Application No. PCT/US2022/033710 dated Dec. 19, 2022. 17 pages.

Prabhakar et al. Plasticine: A Reconfigurable Architecture for Parallel Patterns. Proceedings of the 44th Annual International Symposium on Computer Architecture, ISCA ' 17, ACM Press, New York, New York, USA, Jun. 24, 2017 (Jun. 24, 2017), pp. 389-402.

International Search Report and Written Opinion for International Application No. PCT/US2022/049353 dated Feb. 6, 2023. 17 pages.

International Search Report and Written Opinion for International Application No. PCT/US2022/048357 dated Feb. 22, 2023. 16 pages.

International Search Report and Written Opinion for International Application No. PCT/US2022/048919 dated Feb. 22, 2023. 16 pages.

Deb, D., et al., COPE: Reducing Cache Pollution and Network Contention by Inter-tile Coordinated Prefetching in NoC-based MPSoCs, 2020, ACM. pp. 17:1-17:31. (Year: 2020).

Office Action for Japanese Patent Application No. 2023-570416 dated Jan. 7, 2025. 6 pages.

Deb, D. et al., ECAP: energy-efficient caching for prefetch blocks in tiled chip multiprocessor, 2019, The Institution of Engineering and Technology, pp. 417-428. (Year: 2019).

Gaye et al. An Analysis of the Hot Spot Contention and Message Combining on the SSS-MIN. May 25, 1994. D-I vol. J77-D-I, No. 5, pp. 354-363.

Notice of Grant for Japanese Patent Application No. 2023-571623 dated Feb. 4, 2025. 3 pages.

Notice of Grant for Japanese Patent Application No. 2023-572877 dated Feb. 4, 2025. 3 pages.

Paul, S. et al., Dynamic task allocation and scheduling with contention-awareness for Network-on-Chip based multicore systems, Jan. 2021, Elsevier, 16 pages. (Year: 2021).

Yang, L. et al., Optimal Application Mapping and Scheduling for Network-on-Chips with Computation in STT-RAM Based Router. 2019, IEEE, pp. 1174-1189. (Year: 2019).

* cited by examiner

STREAMING TRANSFERS AND ORDERING MODEL

CROSS-REFERENCE TO RELATED APPLICATIONS

The present application is a continuation of U.S. patent application Ser. No. 17/722,782, which claims the benefit of the filing date of U.S. Provisional Patent Application No. 63/322,285, filed Mar. 22, 2022, the disclosures of which are hereby incorporated herein by reference.

BACKGROUND

A deep neural network (DNN) typically generates large memory accesses, where the dimensions of these accesses can be determined when compiling. Sparse accelerator architectures aim to accelerate embedding layer computations while providing a clean architectural foundation for accelerating other sparse computations. Sparse workloads typically use scatter/gather type memory accesses, particularly embeddings that exhibit small scatter/gather memory accesses from a large parameter space. Further, memory access patterns and access sizes can be determined at runtime by an input sparsity pattern.

However, with these properties, random memory accesses and an inefficient utilization of memory bandwidth can preclude effective pre-fetching. Further, the limited re-use of data for each computation may lead to processors being unable to perform as they simply wait for the data to be fetched. Long latencies to access off-chip memory, control-flow, and data-flow irregularity exacerbate this effect further. The dynamic nature of random memory access also does not lend to effective software techniques like double-buffering.

BRIEF SUMMARY

Generally disclosed herein is a hardware/software interface for asynchronous data movement between an off-core memory and a core-local memory, referred to as "stream transfers", and a stream ordering model. The stream transfers allow software to more efficiently express common data-movement patterns, specifically ones seen in sparse workloads. Stream instructions that belong to a stream are processed in order. For indirect stream instructions, offset elements in an offset list are processed in order. A sync flag is updated to indicate monotonic incremental progress for the stream.

An aspect of the disclosure provides for a method including identifying, with one or more processors, progress of data being transferred between an off-core memory and a core-local memory; identifying, with one or more processors, reads from a core-local memory when the core-local memory is a source of data, wherein reads are issued in-order to the source and serviced by the source out-of-order; identifying, with the one or more processors, writes to the core-local memory when the core-local memory is a destination for the data, wherein writes are issued in-order to the destination and committed by the destination out-of-order; and accessing, with the one or more processors, off-core memory based on indirect scatter/gather memory accesses for reads from the off-core memory when the off-core memory is the source of the data and writes to the off-core memory when the off-core memory is the destination for the data.

In an example, identifying the progress of data being transferred further includes using a core-local synchronization flag. In another example, the method further includes selecting, with the one or more processors, memory accesses to barrier based on scalar fence instructions. In yet another example, accessing the off-core memory based on indirect scatter/gather memory accesses further includes sourcing indirect addresses from a register file or from the core-local memory. In yet another example, the method further includes circular buffering, with the one or more processors, in the core-local memory.

In yet another example, the method further includes updating, with the one or more processors, a core-local synchronization flag to indicate monotonic incremental progress for the data transfer. In yet another example, the method further includes ending, with the one or more processors, the data transfer when all the reads from the core-local memory have issued. In yet another example, the method further includes ending, with the one or more processors, the data transfer when all writes to the core-local memory have committed.

Another aspect of the disclosure provides for a system including one or more processors; and one or more storage devices coupled to the one or more processors and storing instructions that, when executed by the one or more processors, causes the one or more processors to perform operations for transferring data between an off-core memory and a core-local memory. The operations include identifying progress of data being transferred between the off-core memory and the core-local memory; identifying reads from the core-local memory when the core-local memory is a source of the data, wherein reads are issued in-order to the source and serviced by the source out-of-order; identifying writes to the core-local memory when the core-local memory is a destination for the data, wherein writes are issued in-order to the destination and committed by the destination out-of-order; and accessing the off-core memory based on indirect scatter/gather memory accesses for reads from the off-core memory when the off-core memory is the source of the data and writes to the off-core memory when the off-core memory is the destination for the data.

In an example, identifying the progress of data being transferred further includes using a core-local synchronization flag. In another example, the operations further include selecting memory accesses to barrier based on scalar fence instructions. In yet another example, accessing the off-core memory based on indirect scatter/gather memory accesses further includes sourcing indirect addresses from a register file or from the core-local memory. In yet another example, the operations further include circular buffering in the core-local memory.

In yet another example, the operations further include updating a core-local synchronization flag to indicate monotonic incremental progress for the data transfer. In yet another example, the operations further include ending the data transfer when all the reads from the core-local memory have issued. In yet another example, the operations further include ending the data transfer when all writes to the core-local memory have committed.

Yet another aspect of the disclosure provides for a non-transitory computer readable storage medium for storing instructions that, when executed by one or more processors, causes the one or more processors to perform operations for transferring data between the off-core memory and the core-local memory. The operations include identifying progress of data being transferred between the off-core memory and the core-local memory; identifying reads from the core-local memory when the core-local memory is a source of the data, wherein reads are issued in-order to the source and serviced by the source out-of-order; identifying writes to the core-local memory when the core-local memory is a destination for the data, wherein writes are issued in-order to the destination and committed by the destination out-of-order; and accessing the off-core memory based on indirect scatter/gather memory accesses for reads from the off-core memory when the off-core memory is the source of the data and writes to the off-core memory when the off-core memory is the destination for the data.

In an example, accessing the off-core memory based on indirect scatter/gather memory accesses further includes sourcing indirect addresses from a register file or from the core-local memory. In another example, the operations further include circular buffering in the core-local memory. In yet another example, the operations further include updating the synchronization flag to indicate monotonic incremental progress for the data transfer.

DETAILED DESCRIPTION

Figure 1:
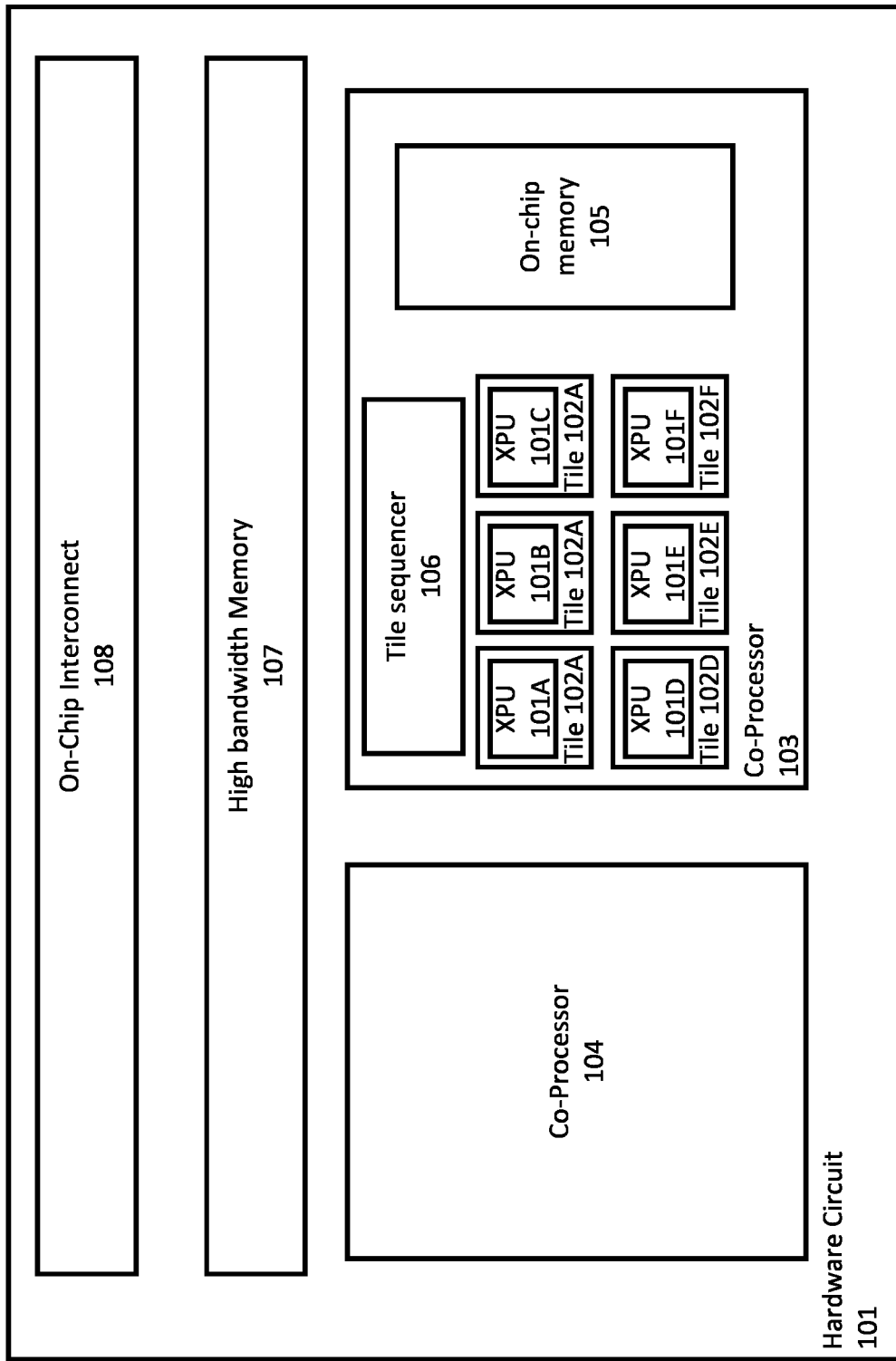
FIG. 1 depicts a block diagram of a hardware circuit for implementing stream transfers according to aspects of the disclosure.

Generally disclosed herein is a hardware/software interface for asynchronous data movement between an off-core memory and a core-local memory, referred to as "stream transfers". The stream transfers may include a stream descriptor which allows software to more efficiently express common data-movement patterns, specifically ones seen in sparse workloads. The stream descriptor is an internal data-structure that represents information necessary for execution of the stream transfer. The information may include control information such as source address, destination address, stream operation code, linear or circular buffers, as examples. The data movement, referred to as "streams," may be initiated by stream instructions, which encode the information necessary for execution of the stream transfer. Each stream may have an associated stream identification (ID) indicated by a data synchronization flag (sync flag) associated with the stream instructions. The stream instructions issued by a core with the same stream ID may form a single stream.

The stream transfer may only move data to or from a core-local memory. Further, only core-local sync flags may be used to track the progress of a stream. The sync flags track partial progress of a stream transfer. They track reads from core-local memory when the core-local memory is the source or track writes to a core-local memory when the core-local memory is the destination. The progress of reads and writes to off-core memory may not be tracked, but to ensure that outstanding writes to off-core memory are committed, scalar fence instructions can be used to allow selection of what memory accesses to barrier.

The stream transfer may include indirect scatter/gather memory accesses, where the address to the source or destination is stored in another memory location that is read first. As an example, indirect addresses are sourced from a register file along with masking support or sourced from memory. The indirect scatter/gather memory accesses may further include different addressing modes, such as row-address or word-address as examples. The stream transfer may include support for a ScatterAdd/GatherAdd mode directly on a memory word. The memory word may be updated atomically. As examples, f32, i32, bf16, and i16 datatypes can be supported.

The stream transfer may include support for circular buffers in a source or destination buffer, which simplifies buffer allocation issues for software as buffer sizes are not known during compiling.

Further generally disclosed herein is a stream ordering model. Synchronization primitives for these transfers allow the data transfer to be treated in-order while the real data transfer is out-of-order. Discrete stream instructions issued by a core that have the same stream ID form a single stream. Hardware provides for ordering guarantees for transfers within a single stream, which can span multiple stream instructions.

The stream instructions that belong to a stream are processed in-order. For indirect stream instructions, an offset list is ordered. For example, the offset elements in the offset list are processed in-order. Writes are issued in-order to destination memory and can be committed by the destination memory out-of-order. Reads are issued in-order to source memory and can be serviced by the source memory out-of-order.

A sync flag is updated to indicate monotonic incremental progress for the stream. If a core-local memory is the source, then the sync flag tracks the reads from it. When the sync flag value is N, it indicates that the first N chunks of data can be overwritten in the core-local memory. If the core-local memory is the destination, then the sync flag tracks the writes to it. When the sync flag value is N, it indicates that subsequent reads to the first N chunks of data in the core-local memory will return the requested data.

The stream can end when the data for the requests preceding and including the last stream descriptor is fully committed to memory. As an example, if the core-local memory is the source, the stream can end when all reads have completed. If the core-local memory is the destination, the stream can end when all writes have committed.

Aspects of the disclosure allow for software to express common data-movement patterns, specifically ones seen in sparse workloads, more efficiently. Aspects of the disclosure can also provide for a complexity-effective solution to hide long memory access latency while keeping the compute core and software programming model of an in-order core.

FIG. 1 is a block diagram of a hardware circuit 101 for implementing stream transfers according to aspects of the disclosure. The hardware circuit 101 can include a co-processor 103, a co-processor 104, high-bandwidth memory 107, and an on-chip interconnect 108. The co-processor 103 can include one or more tiles 102A-F, each tile implementing a respective vector processing unit (VPU), including a cross-lane processing unit (XPU) 101A-F. The co-processor 103 can include a tile sequencer 106 configured to coordinate input and output data across the tiles 102A-F.

The co-processor 103 is configured for performing data-dependent operations using the XPUs 102A-F, or more generally, the VPUs. The XPUs 102A-F are connected to a series of data processing lanes, each lane streaming data through the XPUs 102A-F. The streamed data can be retrieved from the on-chip memory 105, which can be any of a variety of different memory devices, including main memory, cache, or persistent storage, such as solid state or hard disk storage. The streamed data can also be retrieved from the co-processor 104, the high bandwidth memory 107 servicing one or both of the co-processors 103 and 104, and/or another source of data connected to the hardware circuit 101 through the on-chip interconnect 108.

The co-processor 104 can be configured for acceleration of certain operations, such as matrix-matrix multiplication, matrix-vector multiplication, etc. In some examples, the co-processor 104 is on a different device than the rest of the hardware circuit 101 and communicates data to the hardware circuit through the on-chip interconnect 108. The on-chip interconnect 108 can be a data bus or any form of interconnect according to any of a variety of communication standards, for example PCIe.

An example input to the hardware circuit 101 is a tensor representing input data and/or model parameters of a machine learning model to be executed using the hardware circuit 101. A tensor is a data structure generalizing various other common data structure types of differing dimensions. A tensor can include zero or more elements, which can be of one or more different data types, such as integers, floating-point values, Boolean values, etc. Within each data type, a data type can be parameterized according to a certain level of precision, for example an 8-bit, 16-bit, or 32-bit integer or floating-point value. The dimension of a tensor is referred to as its "rank." A tensor of rank zero is a single element, also called a scalar. A tensor of rank one is also called a vector. A tensor of rank two is also called a matrix. Vectors and matrices can also be referred to as having different ranks. For example, a vector of rank two is equivalent to a matrix. A tensor of a non-zero rank can be described as a collection of tensors one rank lower. For example, a vector or rank one is a collection of scalar values, and a matrix of rank two is a collection of vectors of rank one.

The hardware circuit 101 may at least partially implement a processing pipeline for training a neural network. The pipeline may include generating embeddings for input training examples. An embedding can represent features of an input training example using less data, allowing for more efficient processing. Feature tensors for different input training examples will have different degrees of sparsity, which affect the amount of computational work required to generate a corresponding embedding. The hardware circuit can be configured to receive a tensor of feature values representing a training input example and generate an embedding as a tensor having a lower rank than the feature tensor.

To generate the embeddings, the co-processor 103 is configured to implement a variety of data-dependent operations for efficient sparse data computation on the XPUs 102A-F, or more generally, the VPUs. These operations include sorting or summing sparse vectors, operations for summarizing the contents of input vectors, and operations for translating sparse matrices from one sparse matrix storage format to another.

Instead of physical predetermined circuits for accelerating the performance of data-dependent operations, the VPUs, including the XPUs 102A-F, can be configured, for example programmed, to perform a variety of different data-dependent operations. The co-processor 103 allows for generalized support of processing sparse data, while still allowing a complementary co-processor 104 to perform highly efficient and parallelizable operations.

The hardware circuit 101 can be any of a variety of different types of processing units, for example a central processing unit (CPU), a graphics processing unit (GPU), a field-programmable gate array (FPGA), or an application-specific integrated circuit (ASIC), such as a tensor processing unit (TPU). The hardware circuit 101 can be implemented on a computing device, which itself may be part of a system of one or more devices.

Figure 2:
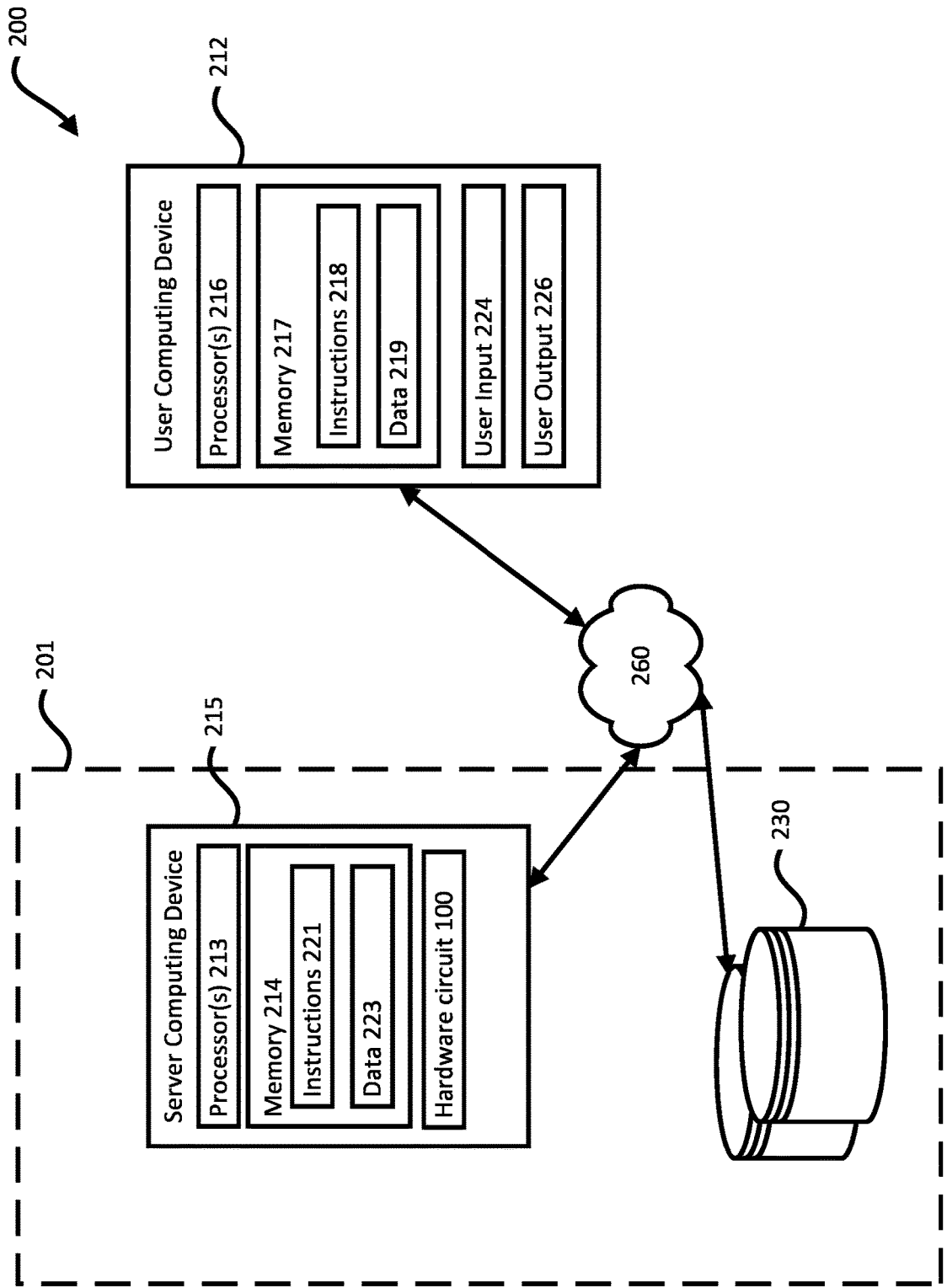
FIG. 2 is a block diagram of an example environment for implementing the hardware circuit according to aspects of the disclosure.

FIG. 2 is a block diagram of an example environment 200 for implementing the hardware circuit 101. The hardware circuit 101 can be implemented on a device having one or more processors in one or more locations, such as in server computing device 215. User computing device 212 and the server computing device 215 can be communicatively coupled to one or more storage devices 230 over a network 260. The storage device(s) 230 can be a combination of volatile and non-volatile memory and can be at the same or different physical locations than the computing devices 212, 215. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 215 can include one or more processors 213 and memory 214. Memory 214 can store information accessible by the processor(s) 213, including instructions 221 that can be executed by the processor(s) 213. Memory 214 can also include data 223 that can be retrieved, manipulated, or stored by the processor(s) 213. Memory 214 can be a type of non-transitory computer readable medium capable of storing information accessible by the processor(s) 213, such as volatile and non-volatile memory. The processor(s) 213 can include one or more central processing units (CPUs), graphic processing units (GPUs), field-programmable gate arrays (FPGAs), and/or application-specific integrated circuits (ASICs), such as tensor processing units (TPUs). The processor(s) 213 can include a co-processor implemented as part of the hardware circuit, as described herein with reference to FIG. 1.

The instructions 221 can include one or more instructions that when executed by the processor(s) 213, causes the one or more processors to perform actions defined by the instructions. The instructions 221 can be stored in object code format for direct processing by the processor(s) 213, or in other formats including interpretable scripts or collections of independent source code modules that are interpreted on demand or compiled in advance. The instructions 221 can include instructions for configuring stream transfers consistent with aspects of this disclosure. The server computing device 215 and/or the user computing device 212 can implement a compiler or other program for generating and sending instructions to the hardware circuit 101 as control signals for configuring the VPUs of the circuit.

The data 223 can be retrieved, stored, or modified by the processor(s) 213 in accordance with the instructions 221. The data 223 can be stored in computer registers, in a relational or non-relational database as a table having a plurality of different fields and records, or as JSON, YAML, proto, or XML documents. The data 223 can also be formatted in a computer-readable format such as, but not limited to, binary values, ASCII, or Unicode. Moreover, the data 223 can include information sufficient to identify relevant information, such as numbers, descriptive text, proprietary codes, pointers, references to data stored in other memories, including other network locations, or information that is used by a function to calculate relevant data.

The user computing device 212 can also be configured similar to the server computing device 215, with one or more processors 216, memory 217, instructions 218, and data 219. The user computing device 212 can also include a user output 226, and a user input 224. The user input 224 can include any appropriate mechanism or technique for receiving input from a user, such as keyboard, mouse, mechanical actuators, soft actuators, touchscreens, microphones, and sensors.

The server computing device 215 can be configured to transmit data to the user computing device 212, and the user computing device 212 can be configured to display at least a portion of the received data on a display implemented as part of the user output 226. The user output 226 can also be used for displaying an interface between the user computing device 212 and the server computing device 215. The user output 226 can alternatively or additionally include one or more speakers, transducers or other audio outputs, a haptic interface or other tactile feedback that provides non-visual and non-audible information to the platform user of the user computing device 212.

Although FIG. 2 illustrates the processors 213, 216 and the memories 214, 217 as being within the computing devices 215, 212, components described in this specification, including the processors 213, 216 and the memories 214, 217 can include multiple processors and memories that can operate in different physical locations and not within the same computing device. For example, some of the instructions 221, 218 and the data 223, 219 can be stored on a removable SD card and others within a read-only computer chip. Some or all of the instructions and data can be stored in a location physically remote from, yet still accessible by, the processors 213, 216. Similarly, the processors 213, 216 can include a collection of processors that can perform concurrent and/or sequential operation. The computing devices 215, 212 can each include one or more internal clocks providing timing information, which can be used for time measurement for operations and programs run by the computing devices 215, 212.

The server computing device 215 can be configured to receive requests to process data from the user computing device 212. For example, the environment 200 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 212 may receive and transmit data specifying a workload or type of composed operation the VPU of the hardware circuit 101 should be configured to perform. The user computing device 212 can send the instructions directly to the hardware circuit 101 or cause the server computing device 215 to generate and send instructions as control signals to the hardware circuit 101 as described herein.

The devices 212, 215 can be capable of direct and indirect communication over the network 260. The devices 215, 212 can set up listening sockets that may accept an initiating connection for sending and receiving information. The network 260 itself can include various configurations and protocols including the Internet, World Wide Web, intranets, virtual private networks, wide area networks, local networks, and private networks using communication protocols proprietary to one or more companies. The network 260 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 260, in addition or alternatively, can also support wired connections between the devices 212, 215, including over various types of Ethernet connection.

Although a single server computing device 215 and user computing device 212 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 3A:
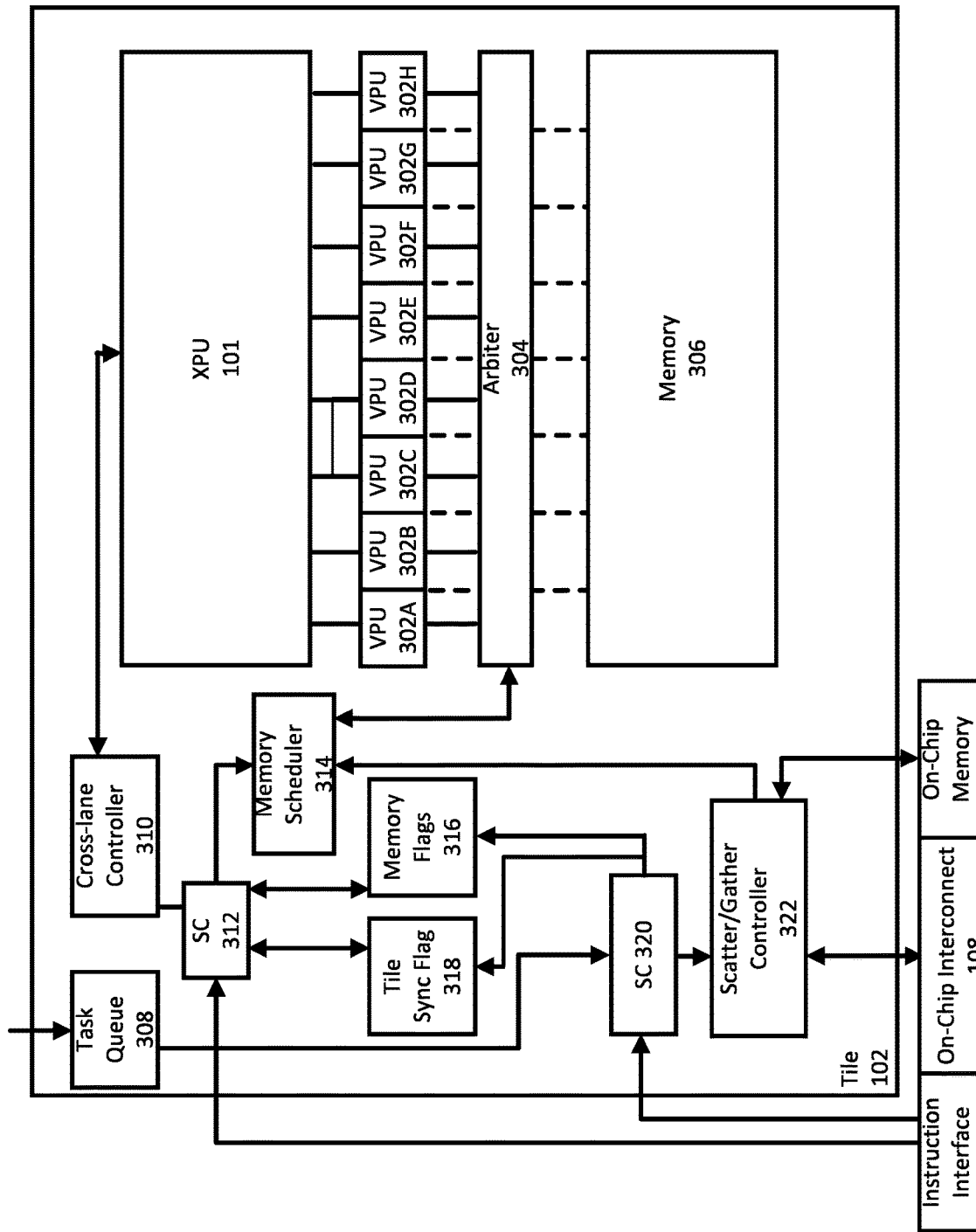
FIG. 3A is a block diagram of an example tile of a hardware circuit for implementing stream transfers according to aspects of the disclosure.

FIG. 3A is a block diagram of an example tile 102 for implementing stream transfers. The XPU 101 is coupled to a cross-lane controller 310. The cross-lane controller 310 provides a separate thread of control to allow cross-lane instructions on the XPU 101. As described herein, the XPU can receive a first instruction, for example through one or more control signals, which can be converted into one or more second and third instructions and provided to processing cells and crossbars of the XPU 101, respectively, for performing a composed operation specified by the first instruction. Instructions to the XPU 101 can be carried over control signals, in which processing cells and crossbars of the XPU 101 are configured to interpret to perform a corresponding primitive operation. An example instruction can be an opcode of an instruction set architecture (ISA).

The tile 102 can receive data from the on-chip interconnect 108, as well as from the on-chip memory 105 as described with reference to FIG. 1. The XPU can also receive instructions from an instruction interface 324, for example from the tile sequencer 106, through a scalar core 312 or scalar core 320. A scatter/gather controller 322 of the tile 102 can receive incoming data, and control what data is passed in the memory 306 through a memory scheduler 314. The memory scheduler 314 coordinates how data is accessed and retrieved from the memory 306. The memory 306 is private to the tile 102, and not accessible by other components connected to the tile 102, such as other tiles. Arbiter 304 is configured to manage which of vector processing units (VPUs) 302A-H access the memory 306, for example on a clock-cycle to clock-cycle basis. The tile 102 can maintain a task queue 308 of tasks to be performed by the tile 102, which are sent to the scatter/gather controller 322 through the scalar core 320. The tile 102 can also maintain registers of tile synchronization flags 318 and/or memory flags 316 for synchronizing the tile 102 with other tiles of the hardware circuit and the memory 306, respectively.

VPUs 302A-H are connected to the XPU 101 through data processing lanes, indicated by solid lines between the XPU 101 and the VPUs 302A-H. The dashed lines between the XPU 101 and the VPUs 302A-H represent control signals, which can be received by control cells in the XPU 101 for configuring the XPU 101 to perform a composed operation corresponding to the received control signals. A vector processing unit is configured for efficient operation on input vectors. The length of vectors processed by the tile 102 at a time can depend on the number (or width) of VPUs implemented by the tile. For example, eight VPUs 302A-H are 8-wide. VPUs 302A-H can process data along the same data processing lane. The VPUs 302A-H can be configured to perform scalar operations on elements of incoming vectors from the memory 306. The VPUs 302A-H can receive data from the XPU 101, which, as described herein, can process data across the data processing lanes, instead of merely along the lanes as performed by each VPU 302A-H.

Figure 3B:
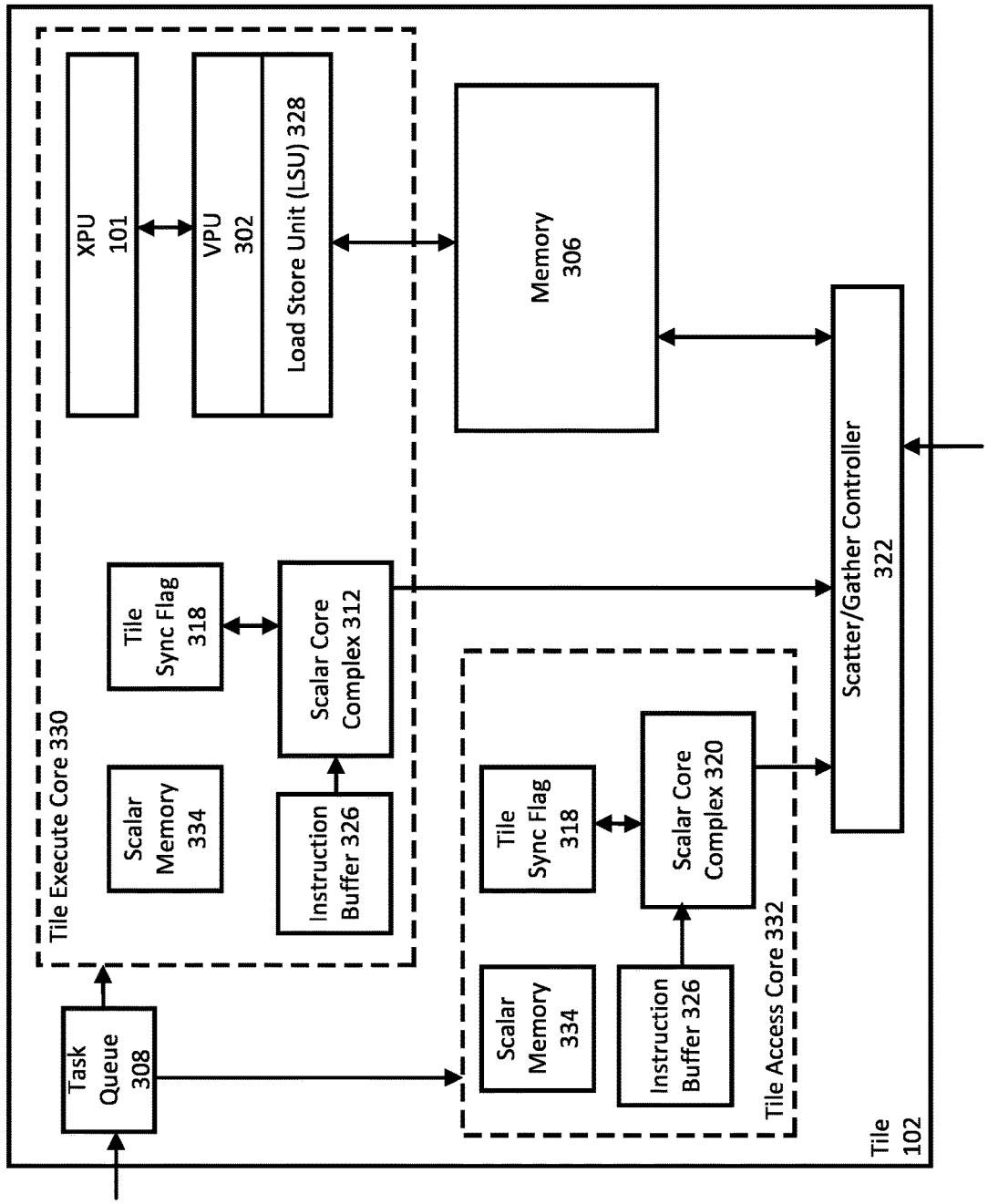
FIG. 3B is a block diagram of another example tile of a hardware circuit for implementing stream transfers according to aspects of the disclosure.

FIG. 3B is a block diagram of another example tile 102 implementing an XPU 101 for stream transfers. The tile 102 can receive data from the on-chip interconnect 108, as well as from the on-chip memory 105 as described with reference to FIG. 1. The XPU can also receive instructions from an instruction interface 324, for example from the tile sequencer 106. A scatter/gather controller 322 of the tile 102 can receive incoming data, and control what data is passed in the memory 306.

This example tile 102 is based on a decoupled access/execute architecture, where a program (and the associated sequence of instructions) can be separated into two streams. The first stream can be an access stream to fetch operands and store results. The second stream can be an execute stream that consumes operands, performs computations, and produces results. These streams run on two separate cores: the tile access core (TAC) 332 and the tile execute core (TEC) 330.

The tile access core 332 is based on a scalar core complex 320 and can be responsible for prefetching operands for executing from the memory 306. The tile execute core 330 is based on a scalar complex core 312 and includes the XPUs 101 and VPUs 302 and can be responsible for performing compute operations on the prefetched operands to produce results. The VPUs 302 are connected to the memory 306 through a load store unit 328. The TAC 332 and TEC 330 have independent instruction streams and together form a producer consumer pair. The tile 102 can maintain a task queue 308 of tasks to be performed by the tile 102, which are sent to TAC 332 and TEC 330.

The TAC 332 and TEC 330 communicate with each other through a scalar memory 334, instruction buffer 326, and tile sync flag 318. The scalar memory 334 can be used by the TAC 332 and TEC 330 to exchange data and can be used as a software managed circular buffer to pass data between the TAC 332 and TEC 330 in a first in first out order. The tile sync flags 318 can be used as a counting semaphore between the TAC 332 and the TEC 330. For example, when a circular first in first out order is being used between the two cores, the producer core increments the sync flag 318 by the number of bytes after every push, stalling when the count reaches the maximum size of the first in first out order. Similarly, the consumer decrements the sync flag 318 after every pop, stalling when the buffer has no data. As the amount of data prefetched can be dynamic, a done bit is used to indicate the end of stream.

Stream transfers allow the tiles 102 and the tile sequencer 106 to move data between tile-local memory, such as memory 306 or scalar memory 334, and off-tile memory, such as memory 105 or high bandwidth memory 107. The data movement can be initiated by stream instructions and can be referred to as streams. Each stream has an associated stream ID which is indicated by the sync flag 318 associated with the stream instruction. Discrete stream instructions with the same stream ID form a single stream.

Stream transfers can move data to or from the tile-local memory and tile-local sync flags 318 are used to track the progress of a stream. The sync flag 318 tracks partial progress of streams being transferred. For example, the sync flag 318 tracks reads from the tile-local memory when the memory is the source or the sync flag 318 tracks writes to the tile-local memory when the memory is the destination. The progress of reads and writes to off-tile memories may not be tracked. To ensure that all outstanding writes to the off-tile memory are committed, scalar fence instructions can be used to allow selection of what memory accesses to barrier. The scatter gather engine 322 tracks the status of the issued stream transfers for each specific memory and communicates this status to the scalar core 320. When a scalar fence is issued to barrier on a particular memory, it waits for the status to indicate all the outstanding stream transfers targeting that memory (read or a write) are fully committed. Once that condition is met, the fence wait is released on the scalar core 320.

Stream transfers can support efficient scatter-gather operations with a strided stream to access off-tile memories and an indirect stream to access off-tile memories from the tile-local memory or a register file. Whether strided stream or indirect stream can be based on a software access pattern. If the software wants to access every Nth element in a tensor, then a strided stream is preferable, though an indirect stream can still work. However, if the software wants to access a random set of elements in a tensor, then an indirect stream should be used.

Stream transfers can also support circular buffer semantics on the tile-local memory.

Stream transfers support the following data movements where granularity and alignment of the data movement is dependent on the source-destination pair. Data can be transferred from the memory 306 to the on-chip memory 105 as well as from the on-chip memory 105 to the memory 306. Data can further be transferred from the memory 306 to a high-bandwidth off-chip memory 107 as well as from the off-chip memory 107 to the memory 306. Data can also be transferred from scalar memory 334 to the on-chip memory 105 as well as from the on-chip memory 105 to the scalar memory 334. As an example, minimum granularity, source alignment, and destination alignment can be 4 bytes. As another example, 32-byte accesses can be used to support 4-byte accesses to the off-chip memory 107. As yet another example, A 32-byte alignment and a minimum length of 128 bytes can ensure performance on stream to or from the off-chip memory 107.

The stream descriptor is an internal data structure that represents all information for the scatter-gather controller 322 to execute a stream transfer. Stream instructions can fully encode fields for the stream descriptor. The following are example fields for the stream descriptor.

For a stream operation code, a gather stream reads an off-tile memory and stores the data to, or adds the data to, a tile-local memory. A scatter stream reads from a tile-local memory and stores the data to, or adds the data to, an off-tile memory. The off-tile memory and tile-local memory is determined by fields off-tile memory type and tile-local memory type respectively.

An add variant of the stream instructions can support both floating point and signed integer add operations. Gather signed integer add and gather floating point add variants can be supported for tile-local memory. Scatter signed integer add and scatter floating point add variants can be supported for off-tile memory and tile-local memory. If an illegal combination is detected, a program error can be raised.

The tile local stream type indicates the address pattern used for accessing the tile-local memory. For example, a linear stream facilitates a number of contiguous words starting at a tile-local start offset. The number of contiguous words can have a 4-byte length. As another example, a circular buffer stream allows software to build logical circular buffers in tile-local memory. In this example access pattern, the base, size, and offset fields in circular buffer metadata are used to generate addresses for a number of words. The number of words can have a 4-byte length. A program error can be raised if an effective length in granularity is greater than a size field in the circular buffer metadata.

The off-tile stream type indicates the address pattern used for accessing the off-tile memory. Linear stream facilitates accessing a number of contiguous locations starting at the off-tile start offset. The actual word size depends on the off-tile memory type. Strided stream facilitates converting a strided access pattern into a multi-dimensional array stored in the off-tile memory type. Stream transfers can support a single level of stride. Indirect streams enable random scatter-gather access patterns into a table. An indirect offset list is used here, where each entry in the list accesses the same length of data.

The source of the indirect offset list can be tile-local memory or a register file. If the source is the tile-local memory, the indirect offset field has a start offset into the tile-local memory where a number of offsets are stored. If the source is the register file, the indirect offset field has the register file and a number of lanes that contain valid offsets are indicated. These offsets are used to perform the scatter or gather operation as indicated by the stream operation code.

A core type indicates the core type that generated the stream descriptor, such as the tile executor core 330 or the tile access core 332. A sync flag core type indicates the core type of the sync flag 318 that tracks the progress of the stream. The encoding can be the same as the core type to allow streams initiated by the tile access core to be tracked by the tile executor core as well as the tile executor core to be tracked by the tile access core.

A sync flag ID indicates an offset within the target sync flag memory. The sync flag ID can also be used as a stream ID and can have ordering guarantees, to be described further below. A set done bit indicates that the current descriptor is the last in the stream. The done bit is set after all the data for the current descriptor and the preceding descriptors in the stream are fully committed to the tile-local memory.

A sync flag count type indicates the type of count the sync flag 318 is tracking, whether number of words or number of descriptors. In both cases, the sync flag 318 tracks the monotonic incremental progress for the stream, but at different granularity.

The tile local memory type indicates the type of tile-local memory participating in the stream transfer, which can include the scalar memory 334 or local banks of memory 306.

A tile local start offset field is used if the tile local stream type is linear. It indicates an aligned start offset word, such as a 4-byte word, within the tile-local memory that is accessed by this transfer. The actual access type depends on the stream operation code.

The tile local stride encodes the stride size and number of bytes accessed in each stride, which is used to access the tile-local memory selected by the tile local memory type. Length, which can be in 4-bytes as an example, does not need to be a multiple of the number of bytes accessed in each stride. The last request of the strided access would access the remaining words of transfer which might be less the length per stride. The stride calculation can be the same for both linear and circular buffer stream types.

A circular buffer metadata field is used if the tile local stream type is a circular buffer. The size of the circular buffer can be a multiple of granularity of the off-tile memory type and the offsets can be aligned. If the circular buffer wrap around, requests are broken into multiple requests, and an error can be raised if the resulting requests are not a multiple of the granularity of the off-tile memory type. An error can also be raised if the total length of the stream transfer is greater than the size of the circular buffer.

An off-tile memory type indicates the type of off-tile memory participating in the transfer. This includes the on-chip memory 105 as well as the high bandwidth memory 107. A high-bandwidth memory view that allows accesses at 4-byte granularity and 4-byte alignment can also be used. If the sequencer 106 is the initiator of the stream transfer, then this field may not have the high bandwidth memory 107 encoded.

A tile ID field is used to select a tile ID for a memory slice.

An off-tile start offset includes a start offset word within the off-time memory 105 indicated by the associated off-tile memory type. The unit of offset can be equal to the values indicated in the offset alignment column in the off-tile memory type. For example, for a high bandwidth memory 107, an offset value of 1 would translate to byte address 32. If the off-tile stream type is indirect, then this field can act as a base address that is added to the offsets read from the indirect offset list before accessing the memory.

An indirect offset can be used if the off-tile stream type is indirect. If the source is tile-local memory, the indirect offset provides the word start offset in the tile-local memory that stores the indirect offset list. If the source is a register file, the indirect offset provides the file register index that sources the indirect offset list. The register file can be read at the time of the stream instructions being issued.

An indirect list size can be used if the off-tile stream type is indirect. If the source is tile-local memory, the number of elements in the offset list is stored in the tile-local memory. If the source is a register file, the number of lanes that contain valid offsets is stored. The completion of the transfer is kept in-order with the rest of the descriptors in the stream.

An indirect list type is used if the off-tile stream type is indirect and indicates the type of offsets stored in the offset list. This can include a word offset and a row offset.

An indirect list stride is used if the off-tile stream type is indirect and indicates the distance between two address words in the offset list stored in the tile-local memory. This can be a signed integer.

An indirect filter field is used if the off-tile stream type is indirect and if this field is set, then an indirect memory address matching the indirect filter value is filtered out. The indirect filter value indicates the value of the element in the indirect access list that needs to be filtered out. The value is the type indicated by the indirect list type. Filtering can be enabled if the indirect filter field is set for an indirect stream and/or the value of the element in the indirect offset list matches this field. The off-tile and tile-local accesses corresponding to the filtered element are dropped but the tile-local buffer will still be advanced by the size of the filtered access.

A length, such as a length in multiples of 4-bytes or 512-bytes as examples, indicates the total number of words that are accessed by the stream. If the off-tile stream type is linear or strided, this field indicates the total number of words that are accessed by the stream. If the off-tile stream type is indirect, this field indicates the number of words that are accessed from each address in the indirect offset list. A program error can be raised if the actual value of this field is not a multiple of the granularity of the off-tile memory type. A program error can also be raised if the generated address exceeds the bounds of the off-tile memory 105.

A stride size field indicates stride size in units of granularity of the off-tile memory type. This can be a signed integer.

A length per stride, such as a length per stride in multiples of 4-bytes or 512-bytes as examples, indicates the number of words accessed in each stride. This is a signed field but should contain non-negative values. The length does not have to be multiple of this field. This field should be a multiple of the granularity of the off-tile memory type selected by this stream descriptor. The last request of the strided access would access the remaining words of transfer which can be less than the length per stride. A program error can be raised if the length per stride is 0, negative, or not a multiple of off-tile memory access granularity. A program error can also be raised if the generated address exceeds the bounds of the off-tile memory 105.

A trace field indicates whether the stream transfer should be traced. Tracing can include logging information about the actions taken during the stream transfer as part of debugging.

Figure 4:
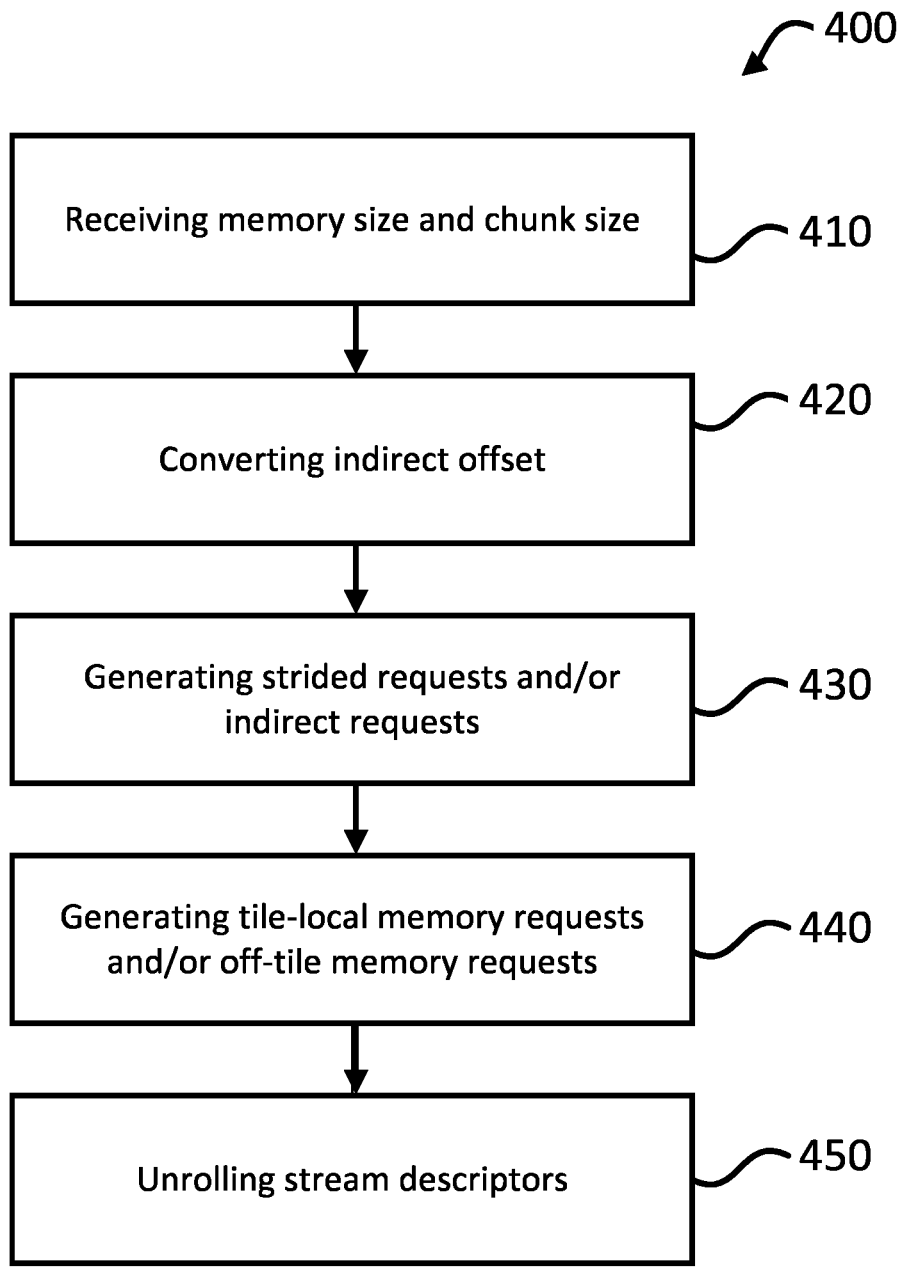
FIG. 4 is a flow diagram of an example process for unrolling a stream descriptor into a constituent off-tile stream request or tile-local stream request according to aspects of the disclosure.

FIG. 4 is a flow diagram of an example process 400 for unrolling a stream descriptor into a constituent off-tile stream request or tile-local stream request. The example process 400 can be performed on a system of one or more processors in one or more locations. For example, the hardware circuit 101, as described above, can perform the process 400.

As shown in block 410, the process includes receiving the size of the off-tile memory, such as receiving the size in 4-bytes. Further, the process includes receiving a maximum chunk size of a stream request targeting an off-tile memory type. As shown in block 420, the process further includes converting the indirect offset read from the file register or tile-local memory to an offset, such as a 4-byte offset, into the off-tile memory based on the indirect list type.

As shown in block 430, the process also includes generating strided and/or indirect requests. For strided requests, the process can include partially unrolling the strided stream descriptor into a set of requests that each access consecutive addresses in the off-tile memory. For indirect tile-local memory requests, the process can include taking an indirect stream descriptor and generating a list of offsets into the off-tile memory type selected by the descriptor. For indirect file register memory requests, the process can include generating a list of offsets from the file register read at the issue of the indirect stream instruction.

As shown in block 440, the process includes generating a list of unrolled off-tile memory requests, where each unrolled request accesses a set of contiguous addresses in the off-tile memory. These requests are used to generate both the tile-local memory request and the off-tile memory requests. The tile-local stride, tile-local stream type, and the alignment are considered while unrolling the requests. The process further includes generating a list of partially unrolled requests, where each partially unrolled request accesses a set of contiguous addresses in the off-tile memory. These requests are further unrolled to generate a set of requests that are aligned to the granularity of the memory selected by the off-tile memory type.

As shown in block 450, the process includes unrolling the stream descriptors into a set of off-tile memory requests and tile-local memory requests.

Figure 5:
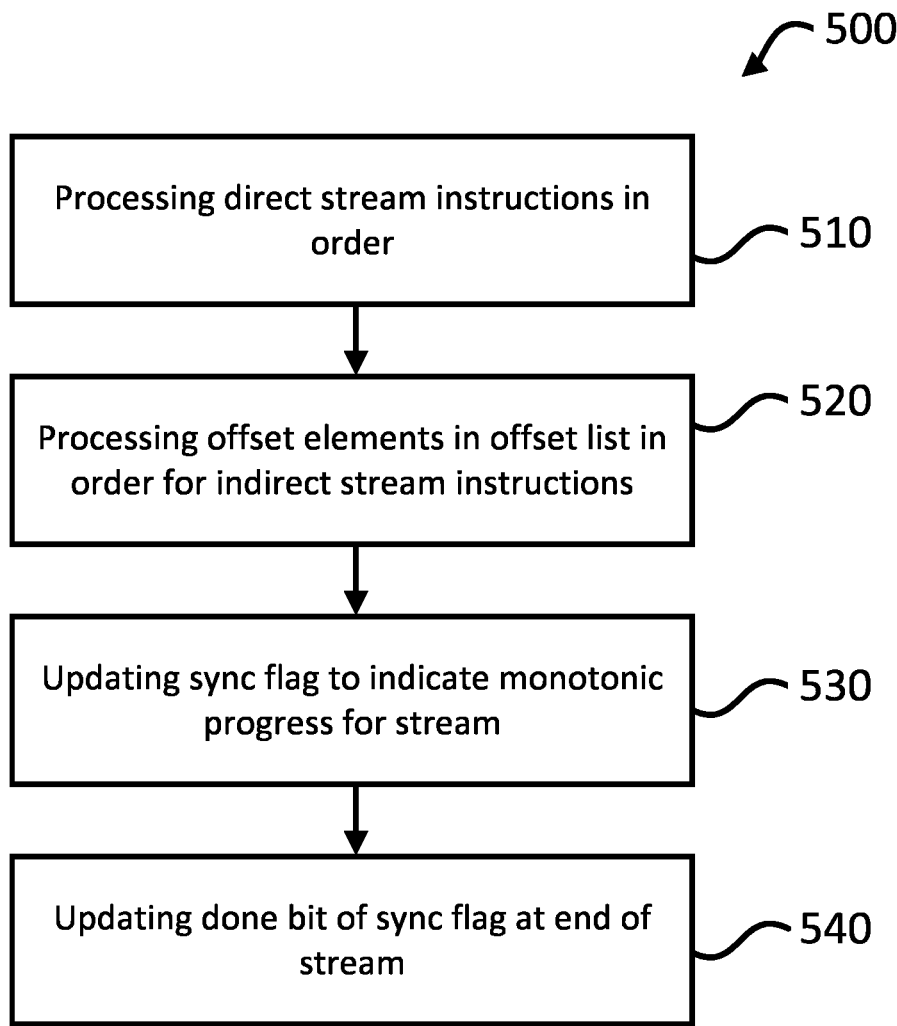
FIG. 5 is a flow diagram an example process for ordering the stream transfers according to aspects of the disclosure.

FIG. 5 is a flow diagram of an example process 500 for ordering the stream transfers. The example process 500 can be performed on a system of one or more processors in one or more locations. For example, the hardware circuit 101, as described above, can perform the process 500. The discrete stream instructions that are issued by a core that have same stream ID form a single stream, but ordering may not be guaranteed across different streams. The scatter gather controller 322 includes multiple threads that can process these requests in parallel. Ordering can be guaranteed for transfers within a single stream, which can span multiple stream instructions.

As shown in block 510, the stream instructions that belong to a stream are processed in order. The requests corresponding to them will be issued in order by the scatter gather controller 322.

As shown in block 520, in the case of indirect stream instructions, the offset list is ordered. The offset elements in the offset list are processed in order. The writes are issued in order to the destination memory, but the writes can be committed by the destination memory out of order. The reads are issued in order to the source memory, but the reads can be serviced by the source memory out of order.

As shown in block 530, the scatter gather controller 322 updates the sync flag 318 to indicate a monotonic incremental progress for the stream. If a tile local memory is the source, then the sync flag 318 tracks the reads from it. A sync flag value indicates the first of chunks of data that can be overwritten in the tile-local memory. If a tile local memory is the destination, then the sync flag 318 tracks the writes to it. A sync flag value here indicates the subsequent reads to the first chunks of data in the tile-local memory will return to the requested data.

As shown in block 540, the done bit in the sync flag 318 can be updated at the end of the stream. This is indicated by the set done bit in the stream descriptor. The done bit can be set after all the data for the requests preceding and including the last stream descriptor is fully committed to memory. All reads have completed if the tile-local memory is the source and all writes have committed if the tile-local memory is the destination.

Figure 6:
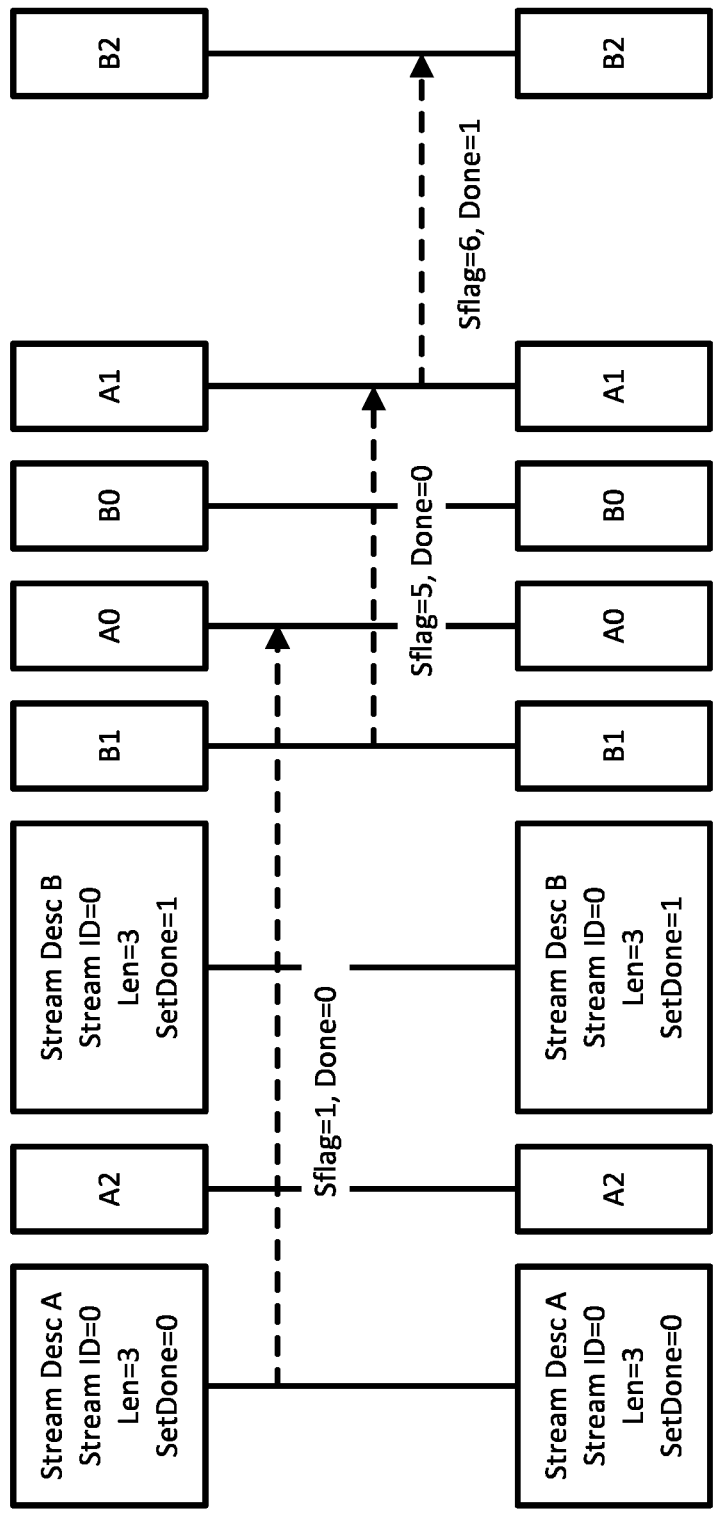
FIG. 6 is an example diagram of the stream ordering according to aspects of the disclosure.

FIG. 6 is an example diagram of the stream ordering. Consider stream descriptors A and B to form a single stream. Stream descriptor B has a set done bit. The partial progress of the stream is tracked by the sync flag. When A0 is committed to memory, either read or write, then the sync flag is updated to a value of 1. Even if A2 and B1 are committed before A0, the sync flag value is not updated to 3. When A1 is committed to memory, the 5 consecutive chunks of data in the stream, A0, A1, A2, B0, B1, are committed, which is indicated by a sync flag value of 5. The done bit is not set at this point as stream descriptor A is not the last in the stream. When B2 is committed, the sync flag value is set to 6. The done bit can now be set as all the data chunks of the stream are committed and the stream descriptor B is the end of the stream.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware and hardware circuits, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for transferring data between an off-core memory and a core-local memory, the method comprising:
   processing, with one or more processors, reads from and writes to the core-local memory in response to the core-local memory respectively being a source of the data and a destination for the data;
   accessing, with the one or more processors, the off-core memory based on indirect scatter/gather memory accesses for reads from and writes to the off-core memory in response to the off-core memory respectively being the source of the data and the destination for the data; and
   tracking, with the one or more processors, monotonic incremental progress for the transferring data after each processing of a read from or write to the core-local memory without tracking progress of at least one of the reads from or the writes to the off-core memory.

2. The method of claim 1, wherein tracking the monotonic incremental progress for the transferring data further comprises incrementing a synchronization flag after each processing of a read from or write to the core-local memory.

3. The method of claim 1, further comprising processing, with the one or more processors, reads from and writes to the off-core memory by selecting memory accesses to barrier based on scalar fence instructions.

4. The method of claim 1, wherein accessing the off-core memory based on indirect scatter/gather memory accesses further comprises sourcing indirect addresses from a register file or from the core-local memory.

5. The method of claim 1, further comprising performing, with the one or more processors, circular buffering in the core-local memory.

6. The method of claim 1, further comprising stopping, with the one or more processors, the transferring data when all reads from the core-local memory have issued.

7. The method of claim 1, further comprising stopping, with the one or more processors, the transferring data when all writes to the core-local memory have committed.

8. The method of claim 1, wherein reads are issued in order to the source of the data and serviced out of order by the source of the data.

9. The method of claim 1, wherein writes are issued in order to the destination of the data and committed out of order by the destination of the data.

10. A system comprising:
    one or more processors; and
    one or more non-transitory storage devices coupled to the one or more processors and storing instructions that, when executed by the one or more processors, cause the one or more processors to perform operations for transferring data between an off-core memory and a core-local memory, the operations comprising:
        processing reads from and writes to the core-local memory in response to the core-local memory respectively being a source of the data and a destination for the data;
        accessing the off-core memory based on indirect scatter/gather memory accesses for reads from and writes to the off-core memory in response to the off-core memory respectively being the source of the data and the destination for the data; and
        tracking monotonic incremental progress for the transferring data after each processing of a read from or write to the core-local memory without tracking progress of at least one of the reads from or the writes to the off-core memory.

11. The system of claim 10, wherein tracking the monotonic incremental progress for the transferring data further comprises incrementing a synchronization flag after each processing of a read from or write to the core-local memory.

12. The system of claim 10, wherein the operations further comprise processing reads from and writes to the off-core memory by selecting memory accesses to barrier based on scalar fence instructions.

13. The system of claim 10, wherein accessing the off-core memory based on indirect scatter/gather memory accesses further comprises sourcing indirect addresses from a register file or from the core-local memory.

14. The system of claim 10, wherein the operations further comprise performing circular buffering in the core-local memory.

15. The system of claim 10, wherein the operations further comprise stopping the transferring data when all reads from the core-local memory have issued.

16. The system of claim 10, wherein the operations further comprise stopping the transferring data when all writes to the core-local memory have committed.

17. The system of claim 10, wherein reads are issued in order to the source of the data and serviced out of order by the source of the data.

18. The system of claim 10, wherein writes are issued in order to the destination of the data and committed out of order by the destination of the data.

19. A non-transitory computer readable storage medium for storing instructions that, when executed by one or more processors, cause the one or more processors to perform operations for transferring data between an off-core memory and a core-local memory, the operations comprising:
  processing reads from and writes to the core-local memory in response to the core-local memory respectively being a source of the data and a destination for the data;
  accessing the off-core memory based on indirect scatter/gather memory accesses for reads from and writes to the off-core memory in response to the off-core memory respectively being the source of the data and the destination for the data; and
  tracking monotonic incremental progress for the transferring data after each processing of a read from or write to the core-local memory without tracking progress of at least one of the reads from or the writes to the off-core memory.

20. The non-transitory computer-readable medium of claim 15, wherein the operations further comprise stopping the transferring data when one or both of all reads from the core-local memory have issued or all writes to the core-local memory have committed.

* * * * *